Dec. 11, 1951  G. SCHUEDER ET AL  2,577,817
FOLDABLE SEAT

Filed Aug. 7, 1946  7 Sheets-Sheet 7

INVENTORS
George Schueder,
Henry Lee Dunlap,
BY James Gavagan.

Harness, Dickey & Pierce.
ATTORNEYS.

Patented Dec. 11, 1951

2,577,817

UNITED STATES PATENT OFFICE 2,577,817

FOLDABLE SEAT

George Schueder and Henry Lee Dunlap, Dearborn, and James Gavagan, Detroit, Mich., assignors to Evans Products Company, Detroit, Mich., a corporation of Delaware Application August 7, 1946, Serial No. 689,050

7 Claims. (Cl. 155—151)

The present invention relates to seat and bed structures and the like, and particularly to such structures possessing such strength in proportion to their weight as to render them especially suitable for use in airplanes.

Among the principal objects of the invention are to provide such a seat structure of greater strength and rigidity in proportion to its weight, against loads applied in all directions, than seat structures previously available for analogous purposes; to provide such a seat structure which despite its very light weight is extremely comfortable; to provide such a seat structure which may quickly and easily be folded flat, so that it does not interfere with usability of otherwise available cargo space, and which may also be conveniently moved about or removed entirely from the airplane or its other normal place of installation, yet is rigidly held against movement when in use.

Another important object is to provide such a seat structure having portions adjustable to suit the comfort of the occupant and which includes a comfortable headrest formed as a part of the seat back, all parts of the seat back, head support and supporting framework, being formed of lightweight materials such as canvas webbing and metallic tubing arranged in a novel manner to impart great rigidity and self-bracing characteristic despite the very simple, compact and easily portable and foldable nature of the construction.

Other objects will be apparent upon consideration of the present disclosure in its entirety.

In the drawings:

Fig. 3 is a horizontal sectional plan view taken substantially on the line 3—3 of Fig. 1 and looking in the direction of the arrows;

Referring now to the drawings, and particularly to the embodiment of Figs. 1–10 inclusive, the principal elements of the seat-supporting framework may be fabricated of hollow metallic tubing, and this type of construction is illustrated, although it will be recognized that this is a matter of design and subject to variation without departure from the broader aspects of the invention. The seat shown in the embodiment under consideration is adapted to accommodate two passengers, the seat portion itself, generally designated 10, being formed of relatively heavy canvas or other suitable flexible material secured along its front edge, as by clamping strips 12 and self-tapping screws 14, to the tubular front frame rail 15. A tubular rear frame rail 16 supports the rear edge of the seat material, which may be looped over such rail and back under the seat, to which it is sewn, as indicated at 18, along a seam parallel to but spaced forwardly from the rear rail. The same seam 18 may also be employed to secure the lower edge of the seat back 20 to the seat portion 10.

Figure 1:
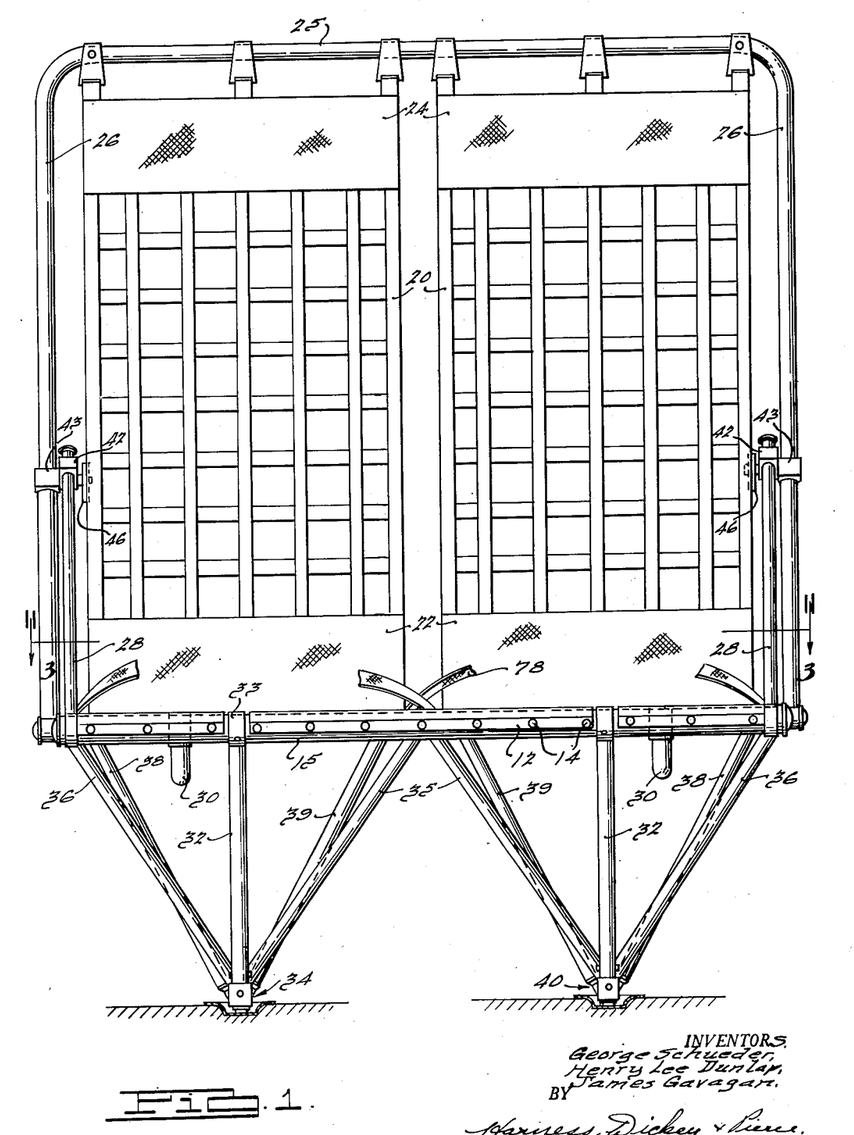
Fig. 1 is a front elevational view of a double seat construction incorporating the present invention, fragmentarily showing the floor of an airplane to which the seat is secured, although the indicated installation is of course intended as representative rather than as designating any exclusive field of utility.

The back is also preferably formed of fabric and may be divided into two sections, as indicated in Fig. 1, so that the tendency of the occupants to disturb one another by moving is minimized. Each back section 20 may be formed of open-mesh webbing, except for its lower, hip-supporting portion 22 and its upper, head rest section 24, which portions are preferably of solid fabric, as shown. The seat back supporting frame consists of a single loop of metallic tubing of inverted U form having a horizontal top cross bar 25 and integral, downwardly extending side portions 26, the lower extremities of which are pivoted to the back rail 16 and swingable about the axis of the latter for adjustment and to fold the seat.

The back frame is normally held against swinging movement by angular braces 28, one of which is pivotally connected to and near each end of the front rail 15, while the rear extremity of each such brace is attached, by means presently to be described in greater detail, to an intermediate portion of the adjacent side section 26 of the seat back frame.

A pair of rigid, tubular spreaders 30 connects the front and back rails at spaced points to maintain the desired spaced relationship of the latter. As indicated in Fig. 2, the intermediate portions of the spreaders are preferably depressed as by curving them downwardly to provide seat clearance.

The supporting leg structure is of a self-bracing but readily foldable character, these parts also preferably being formed of tubing. Two vertical front legs 32 are provided, both attached pivotally to the front rail 15 and one located substantially centrally with respect to each individual passenger section, as viewed in Fig. 1. The lower end of each front leg is provided with latching means, presently to be described in greater detail, for detachably connecting it to the floor or other supporting surface. The same latching means, generally designated 34, also provides in each instance, a separable connection between the front leg 32 and a pair of bracing legs 35, 36 at a point near the floor, so that in effect the front leg and bracing legs are rigidly connected to the floor by the same latching means. The bracing legs extend upwardly and rearwardly therefrom to pivotal connection with the rear rail 16. Two rear leg assemblies of V-form are provided, one beneath each section of the back, pivoted at their upper ends to the back rail 16 and swingable thereabout during folding in a manner presently to be described. The outermost leg section of each complete V-leg structure is designated 38, while the inner leg section is in each instance designated 39. The sections 38 and 39 are joined together substantially at the floor, to which they are secured by coupling means generally designated 40, which also serves to secure them together. Each of the leg portions 32, 35, 36, 38, 39, is secured at its upper end, as by welding, to a collar 33 rotatably fitted upon the frame rail to which it is connected.

Figure 2:
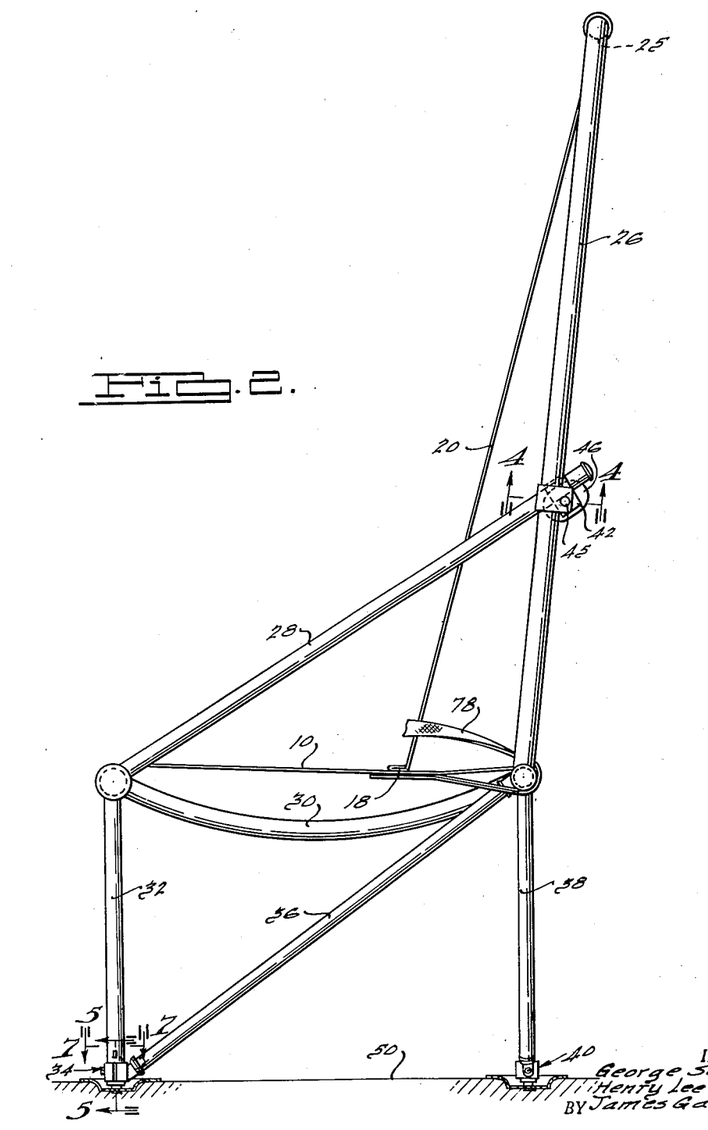
Fig. 2 is a side elevational view of the same.
Figures 4, 5, 6:
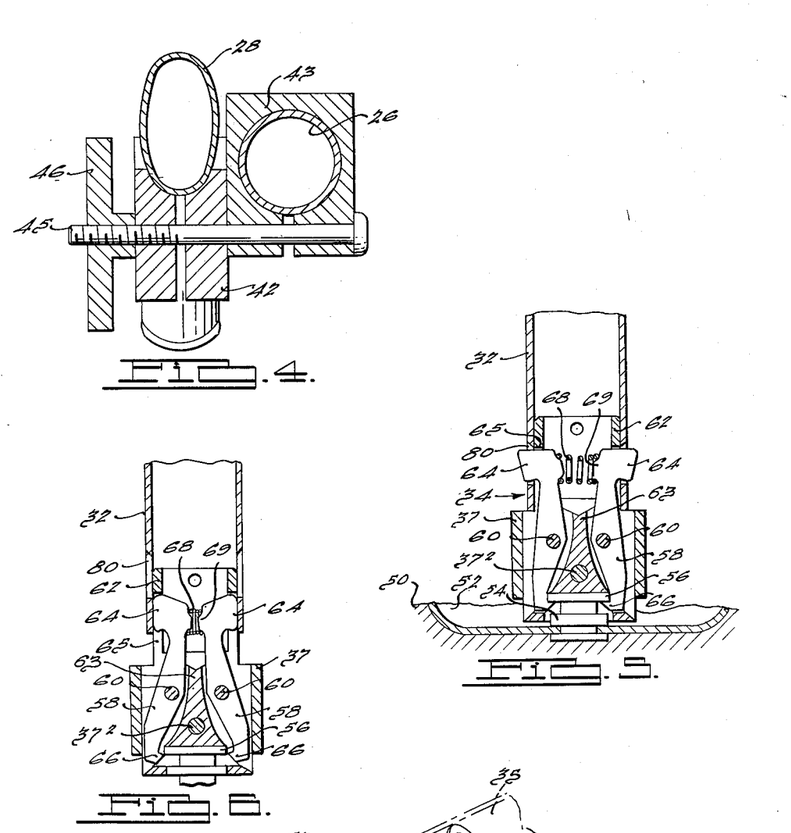
Fig. 4 is a sectional detail taken substantially on the line 4—4 of Fig. 2 and looking in the direction of the arrows.
Fig. 5 is a sectional view taken substantially on the line 5—5 of Fig. 2 and looking in the direction of the arrows.
Fig. 6 is a sectional view similar to Fig. 5 but showing the latching means released.

At their upper rear ends, the braces 28 are connected to back uprights 26 by means best shown in Figs. 1, 2, and 4, comprising a pair of split collars 42, 43, the former slidable along the rods 28 when their ends are free, but rigidly secured thereto when their ends are clamped together, while the collars 43 are similarly mounted on the tube portion 26. A single clamping bolt 45 extends through the split end portions of both collars and hand-nuts 46 threaded upon the inner end of the bolt enables freeing or clamping the collars at will. When the collars are free to slide in the indicated manner, the seat back frame may be adjusted as to angularity, or swung forwardly and downwardly, about the rear rail 16 to lie flat against the seat. During such movement the braces 28 swing downwardly and rearwardly about the front rail 15, and also lie flat against the seat when fully folded. These parts may be rigidly locked in any desired relative positioning by tightening the clamping hand-nuts 46, as will be apparent.

Figure 7:
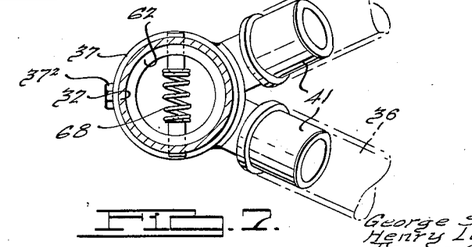
Fig. 7 is a sectional detail taken substantially on the line 7—7 of Fig. 2 and looking in the direction of the arrows.

To secure the lower extremities of the front legs to a floor, as 50, we preferably provide latching means constructed as shown in Figs. 5, 6 and 7. The floor is provided with depressions located at spaced points, each depression being lined by a sheet metal cup 52 and having centrally upstanding therefrom a stud 54 having an overhanging head portion 56. This will be recognized as typical of cargo airplane construction. The leg portions are so spaced as to accommodate their lower ends to the spacing of such studs, and the above-mentioned latching means provide means for detachably connecting the bottoms of the legs to the studs. The holding elements of each latching assembly comprise a pair of pawl-like latching dogs 58 longitudinally mounted in a supporting casing 62, in which casing they are pivotally disposed upon transverse axes defined by pins 60 transfixing casing 62. Each of the dogs 58 has a finger portion 64 normally projecting outwardly from its upper extremity through a slot as 65 in the latch casing, the two dogs being diametrically opposed, as are their finger-actuating portions 64, and the disposition of the last-mentioned portions being such that both may be actuated inwardly simultaneously by the thumb and finger, to swing their hooked lower extremities 66 outwardly and away from their normal under-engaging relationship with respect to the stud head 56, thereby freeing the latch assembly from the floor. A helical compression spring 68 is trapped between suitable locating tabs as 69 formed upon the upper inwardly facing portions of the dogs directly behind their finger portions 64 to urge the latter outwardly and the hooked portions 66 to latching position.

Referring to Fig. 5 it will be noted that the lower end of each front leg 32 is fitted over the upper portion of latch casing 62 and over the upper ends of the latching dogs, the legs 32 being provided with slots 80 through which the latch finger pieces 64 project when the seat is erected and latched to the floor. The finger portions 64 thus retain the legs 32 in position with respect to the upper portion 62 of the latch casing. When the finger pieces are moved inwardly, to the position shown in Fig. 6, they are free from their over-engaging relation with respect to the slotted portions of the front legs, which then may be pulled free of the latch casings. The latch casing portions 62 have a loose sliding fit within the lower extremities of the legs 32. The lower ends of bracing legs 35, 36 are attached by thimbles 41 to a collar 37 secured as by a through bolt 37² to the lower portion 63 of the latch casing. It will be seen that by virtue of this arrangement, leg 32 is freed at its lower end at the same time that the latch is released to free the latch casing and the lower ends of bracing legs 35, 36 from the floor. When the parts are thus separated, and legs 38, 39 are freed from the floor by release of the rear latch units 40, legs 32 may be swung clockwise, as viewed in Fig. 2, to lie flat over the seat, while the leg assemblies 35, 36 and 38, 39 may also be swung upwardly, clockwise as viewed in Fig. 2, until they lie flat beneath the seat bottom. The back may then be swung forwardly and downwardly in the manner previously described, so that the entire seat assembly may be folded into a very compact, flat and easily transported package.

The securing means used to detachably fasten the rear legs 38, 39 to the floor may be of the same type as used for the front legs, and are preferably identical in so far as the latch casing 62 and the parts carried thereby are concerned. A collar 70 is provided at the juncture of the V formed by each pair of rear leg elements 38, 39 and bottom fittings 72 are provided at the lower extremity of each such leg element, in the form of perforated ears contoured to fit against opposite sides of the collar 70 and secured thereto by a bolt 74 which diametrically transfixes the collar 70 and the lower portion 63 of the body of the latching unit. Release of the rear latching units frees the rear leg assemblies to permit the same to be swung upwardly to a folded position in which they lie flat against the seat bottom, as will be apparent. The upper extremities of the tubular latch casing portions 62 of the rear latches project above the collars 70, and may be closed by means of caps 76.

Safety belts as 78 may be provided, where the seats are for use in aircraft, and these may be looped around and under the rear rail, as best shown in Fig. 2, and secured to the underside of the seat portion 10 by the same seaming 18 which secures the seat material and back 20, as previously described.

Figures 8, 9, 10, 11, 12:
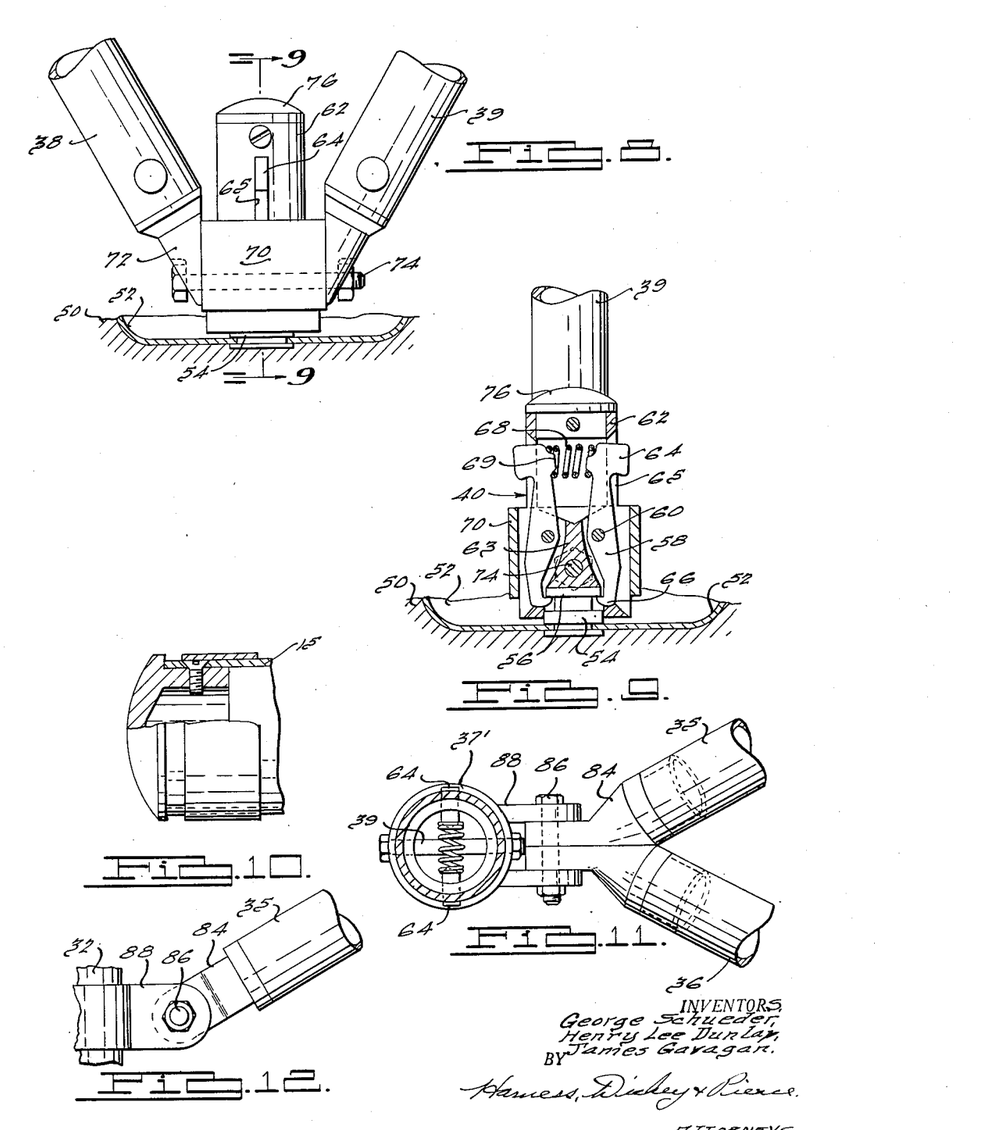
Fig. 8 is a fragmentary elevational view of the rear leg securing means and adjacent parts.
Fig. 9 is a sectional view taken substantially on the line 9—9 of Fig. 8 and looking in the direction of the arrows.
Fig. 10 is a part sectional elevational view of an end portion of one of the tube structures, showing cap means used to close the ends of certain of the tubes.
Fig. 11 is a cross-sectional view corresponding to Fig. 7 but showing a somewhat modified construction.
Fig. 12 is a fragmentary side elevational view of the modified construction.

An alternative folding arrangement is provided by incorporating simple hinging means in each of the front leg fitting adapters in the manner shown in Figs. 11 and 12. As there indicated, thimble portions 84 secured in the lower extremities of the inclined bracing legs 35, 36 are connected to one another by a transverse bolt 86 which also pivotally secures them to interfitted lug portions 88 rigidly secured to and projecting rearwardly from a collar 37' which encircles and is secured to the lower portion of the latch casing, and corresponds to the collar 37 previously described. In folding the modified assembly, the screw 39 which secures collar 37' to the latch casing 62 is removed, permitting the leg 32 to slide upwardly out of the collar 37' so that the leg 32, may swing up and over the seat and the braces 35 and 36 up under the seat until such leg portions lie adjacent an imaginary plane passing through the front and rear rails 15 and 16. The back construction may correspond to that previously described, and when the back is of sufficient height to provide a headrest, as indicated, its length is such that it projects forwardly when folded somewhat farther than do the folded legs 32. The folded seat accordingly occupies no more room than does the embodiment first described when folded.

In Figs. 13–16 inclusive, a modified seat construction adapted to accommodate a single occupant is depicted, so designed that although effectively braced against vertical, transverse and angular loads in all directions, and also adapted to support the static load at four well-spaced points, only two quickly detachable latching mechanisms, similar to those previously described, are employed to rigidly hold the seat to the floor and prevent all lost motion between seat and floor, while the seat may be quickly and easily folded flat when detached, in a manner analogous to the methods of folding the constructions previously described.

Parts analogous to those previously disclosed in connection with the first embodiment are designated by like reference characters, one hundred integers higher, and detailed redescription of many of these will be seen to be unnecessary. Two spaced front legs 132 are provided, vertically disposed and connected near their lower ends by a transverse stretcher 90, which may be welded to the legs 132, as indicated. The back legs 139 are also vertical and connected near their bottoms by a transverse stretcher assembly 91, the upper ends of all of the above-mentioned legs being pivoted as by means of rotatable collars 133 to the front and back rails 115, 116. Angular bracing tubes 138 are welded at their upper ends to the legs 139, near the tops of the latter, and the lower ends of the braces are rigidly united as by welding to a coupling weldment which also forms a central portion of the stretcher assembly 91. The weldment includes a vertical tubular portion 92 and a gusset plate 93. A portion of the tubular portion 92 extends downwardly to support a rear latching unit 140, fitted thereinto and corresponding in construction to the latching unit 40 of the first described embodiment. By means of latching unit 140 the rear portion of the seat leg structure may be detachably secured to the floor 150. A latching unit 134 is also secured to the mid-portion of the front stretcher 90 being mounted in and supported by a short vertical leg 94 welded or otherwise rigidly attached to and projecting downwardly from the stretcher 90. The function and construction of the latching unit 134 may of course correspond to those of the latching unit 34 previously described. In like fashion the leg portion 94 also supports a collar 137 which serves as attaching means for the inclined upwardly and rearwardly extending bracing legs 135, 136, the lower ends of which may be welded to such collar, while their upper ends are pivotally attached by rotatable collars 133 to the tubular rear seat rail 116. The front and back rails are also connected at spaced points by tubular spreaders 130.

Figure 13:
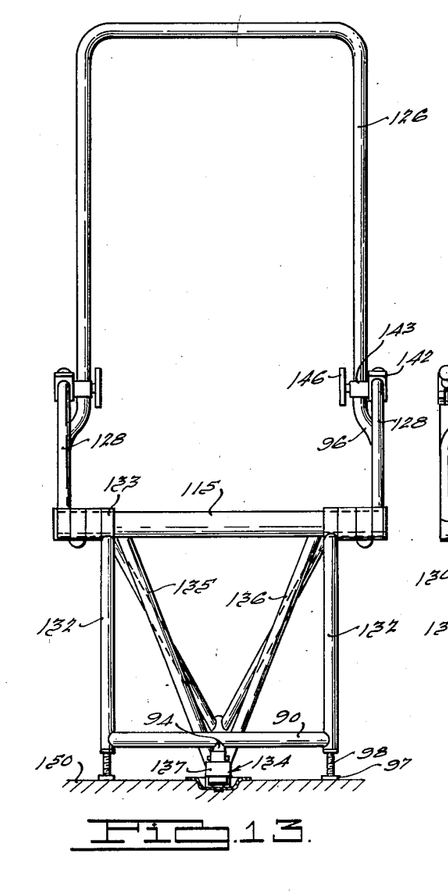
Figs. 13 and 14 are front and rear elevational views respectively of a seat frame structure of somewhat modified design, for a single occupant.
Figure 14:
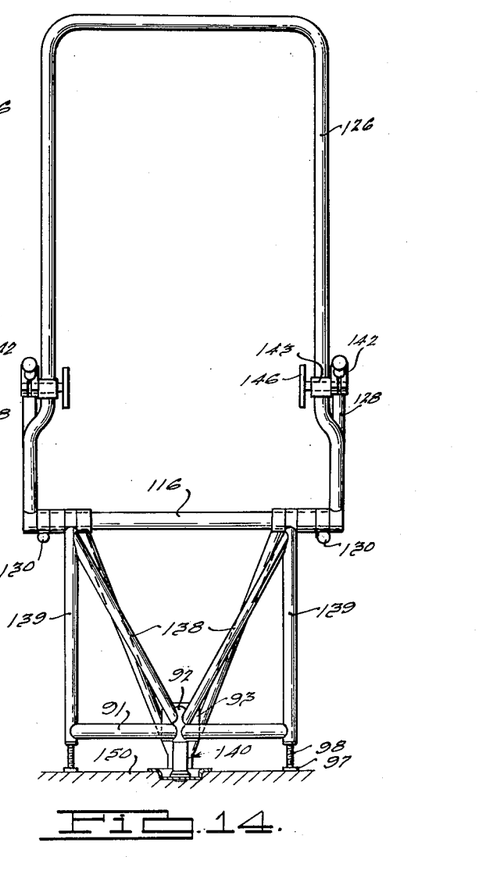
Figure 15:
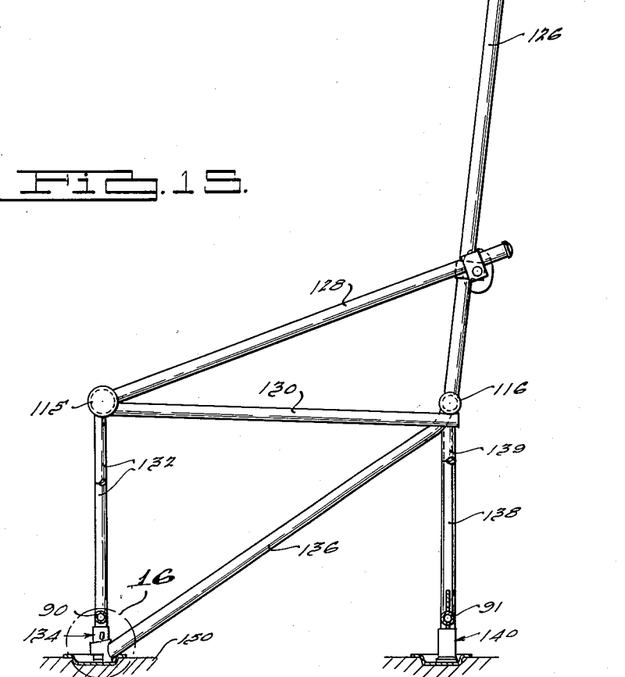
Fig. 15 is a side elevational view thereof, partly in section.
Figure 16:
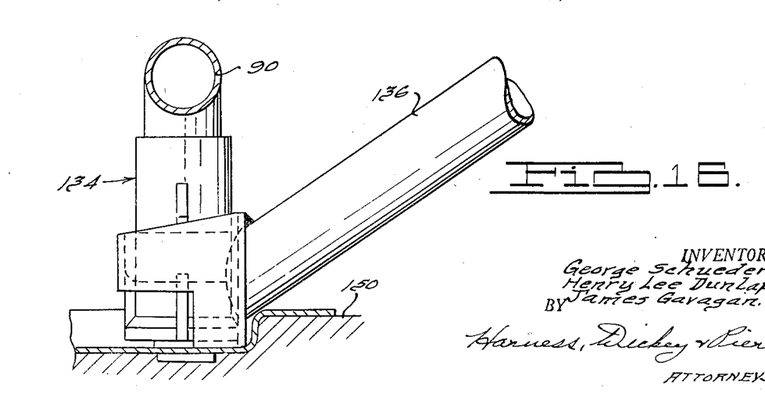
Fig. 16 is a fragmentary elevational view upon a larger scale of the parts enclosed in the circle designated 16 in Fig. 15, showing the front leg securing means and adjacent parts.

The tubular seat back frame 126 is of generally similar inverted U outline, although its lower extremities are outwardly offset, as indicated at 96, directly below the point of attachment of the coupling element 143 which supports the releasable clamping means for the angular seat back braces 128. The body portion 143 of the coupling assembly may be rigidly fixed to the seat back portion 126 while the split block 142 is slidable along the angular brace 128 when its split ends are separated by loosening of the clamping nut 146. Block 142 is rotatable with respect to the block 143 when the clamping bolt 145 and nut 146 are loosened, thereby permitting both angular movement of the seat back and bracing portions 126, 128, and sliding of the blocks 142 along the braces.

Vertically adjustable pads 97 are provided at the bottoms of the four leg portions, the pads having threaded shanks 98 fitted in suitably tapped openings in the legs. These will be seen to permit taking up all lost motion in the latching means after the seat is coupled to the floor, permitting rigid securance of the seat despite the quick detachability provided by the latching means.

When the latching portions 134, 140 are released from the floor, collar 137 may be pulled downwardly to free it from the latching unit 134, so that the front, rear and bracing leg structures may be separately swung upwardly, the front leg structure consisting of legs 132, stretcher 90 and the parts carried thereby being swingable about the front rail 115 while the bracing legs structure 135, 136 and the rear legs structure may be swung upwardly about the rear rail 116.

It will be apparent that various other modifica-

We claim:

1. A folding seat frame construction comprising, in combination, a front support rail, a rear support rail spaced from the front rail and substantially parallel thereto, a front leg structure pivotally attached to the front rail, a rear leg structure pivotally attached to the rear rail, fitting means connected to one of said leg structures and providing a footing therefor, leg bracing structure pivotally attached to the other of the rails and extending at an angle downwardly therefrom to said fitting means, said bracing structure being connected to said fitting means whereby said fitting means serves to interconnect the leg structure for the one rail and said bracing structure, said fitting means being releasably connected to one of the structures which it interconnects whereby said leg structure may be separated from said bracing structure, upon separation said leg structure and said bracing structure each being pivotal about the respective rail to which it is attached to a position adjacent an imaginary plane passing through the two rails.

2. The invention as set forth in claim 1 wherein said bracing means comprises struts pivotally attached to substantially spaced points on the other of the rails and converging toward each other and joined together by said fitting means.

3. The invention as set forth in claim 1 wherein one of said structures is slidably mounted in said fitting means and removable therefrom by sliding movement relative to the fitting means.

4. The invention as set forth in claim 1 wherein said bracing structure is slidably mounted in said fitting means whereby it is separable therefrom to permit independent pivotal movement of the leg structure and the bracing structure about the respective rails to which they are attached.

5. The invention as set forth in claim 1 wherein said leg structure is slidably mounted in said fitting means whereby it is separable therefrom to permit independent pivotal movement of the leg structure and the bracing structure about the respective rails to which they are attached.

6. The invention as set forth in claim 1 wherein the bracing structure is attached to the rear rail and the leg structure is attached to the front rail.

7. A folding seat frame construction comprising a front support rail, a rear support rail, spacer members extending between and pivotally connected to said rails and maintaining them in spaced relationship, a front leg structure pivotally connected to the front rail, a rear leg structure pivotally connected to the rear rail, said structures being adapted to support the rails above a floor so that they are substantially parallel to the floor, said front leg structure including a plurality of legs extending perpendicularly to said front rail and adapted to be vertically disposed when the seat is in operative position, said rear leg structure including a pair of leg elements extending at an angle to said rear rail and being mounted thereon at substantially spaced points and converging toward each other to meet adjacent their lower extremities, said leg elements being adapted to be in a substantially vertical plane when the seat is in operative position, means firmly joining the lower extremities of said leg elements together, bracing strut structure pivotally connected to said rear rail, said strut structure including struts extending at an angle to said rear rail and being mounted thereon at substantially spaced points and converging toward each other and extending downwardly and toward the front rail so that their lower extremities meet adjacent the bottom of said front leg structure, and means releasably securing the extremities of said struts to said front leg structure to permit independent pivotal movement of said bracing structure and front leg structure about the rear and front rails respectively, said leg elements and struts being pivotal, when disconnected from each other, about their respective rails to positions adjacent an imaginary plane passing through the two rails.

GEORGE SCHUEDER.
HENRY LEE DUNLAP.
JAMES GAVAGAN.

REFERENCES CITED

The following references are of record in the file of this patent:

UNITED STATES PATENTS

| Number | Name | Date |
| --- | --- | --- |
| 472,603 | Hamilton | Apr. 12, 1892 |
| 1,488,825 | Myers | Apr. 1, 1924 |
| 1,728,573 | Powers | Sept. 17, 1929 |
| 1,728,640 | Tompkins | Sept. 17, 1929 |
| 1,830,119 | Marshall | Nov. 3, 1931 |
| 1,832,486 | Johnson | Nov. 17, 1931 |
| 1,869,365 | Corduan | Aug. 2, 1932 |
| 2,396,039 | Burton | Mar. 5, 1946 |
| 2,397,322 | McArthur | Mar. 26, 1946 |

FOREIGN PATENTS

| Number | Country | Date |
| --- | --- | --- |
| 38,122 | France | Apr. 1, 1931 |
| (1st addition to No. 667,881) | | |